United States Patent
Kakinuma et al.

(10) Patent No.: US 8,267,825 B2
(45) Date of Patent: Sep. 18, 2012

(54) TRACK CAR DRIVE SYSTEM, AND TRACK CAR USING THE SYSTEM

(75) Inventors: Hirohiko Kakinuma, Sapporo (JP); Iwao Sato, Sapporo (JP); Hiroyuki Ihara, Sapporo (JP); Tadashi Inaba, Sapporo (JP); Hideki Nakamura, Saitama (JP); Ryo Karasawa, Minamikambara-gun (JP); Takahiro Ono, Nigata (JP)

(73) Assignees: Hokkaido Railway Company, Hokkaido (JP); Hitachi Nico Transmission Co., Ltd., Saitama (JP)

( * ) Notice: Subject to any disclaimer, the term of this patent is extended or adjusted under 35 U.S.C. 154(b) by 539 days.

(21) Appl. No.: 12/529,215

(22) PCT Filed: Mar. 18, 2008

(86) PCT No.: PCT/JP2008/054953
§ 371 (c)(1),
(2), (4) Date: Aug. 31, 2009

(87) PCT Pub. No.: WO2008/126646
PCT Pub. Date: Oct. 23, 2008

(65) Prior Publication Data
US 2010/0107921 A1 May 6, 2010

(30) Foreign Application Priority Data
Apr. 5, 2007 (JP) ................... 2007-099189

(51) Int. Cl.
*F16H 37/06* (2006.01)
(52) U.S. Cl. .............................. 475/152
(58) Field of Classification Search .............. 475/207, 475/211, 210, 298, 230, 198, 200, 201, 302, 475/343
See application file for complete search history.

(56) References Cited

U.S. PATENT DOCUMENTS
2003/0069103 A1* 4/2003 Ibamoto et al. .......... 475/5
(Continued)

FOREIGN PATENT DOCUMENTS
CH 296104 4/1954
(Continued)

OTHER PUBLICATIONS
Notification of transmittal of Translation on the International Preliminary Report on Patentability dated Oct. 22, 2009.
(Continued)

*Primary Examiner* — David D Le
*Assistant Examiner* — David J Hlavka
(74) *Attorney, Agent, or Firm* — Antonelli, Terry, Stout & Kraus, LLP.

(57) ABSTRACT

Provided is a track car drive system, which is assisted by a generator motor so that it may attain a gear array for equalizing the number of speed range and the gear ratios at the individual gears as a transmission for the forward speed and the backward speed and which can be combined with the generator motor. A transmission (15) for receiving the output of an engine (14) at an input shaft (30) is constituted by combining a forward range (31) and a backward range (32) with two intermediate shafts (41 and 42) having different speed ranges (51 to 54) between themselves and an output shaft (45). By shifting/fastening a first clutch (43) or a second clutch (44) selectively, the rotation of either the forward range (31) or the backward range (32) is transmitted to either of the intermediate shafts (41 and 42). When one of the speed ranges (51 to 54) is selected, the same gear number and gear ratio are taken no matter whether the track car might run forward or backward. The assist force by the generator motor (18) is applied from a differential mechanism (55) through the two intermediate shafts (41 and 42) to the output shaft (45).

15 Claims, 8 Drawing Sheets

U.S. PATENT DOCUMENTS

2003/0166429 A1 * 9/2003 Tumback .......................... 475/5

FOREIGN PATENT DOCUMENTS

| DE | 10 2005 043 953 A1 | 3/2007 |
|----|----|----|
| JP | 03-004057 | 1/1991 |
| JP | 04-110252 | 9/1992 |
| JP | 2002-089594 | 3/2002 |
| JP | 2002-204504 | 7/2002 |
| JP | 2003-106389 | 4/2003 |
| JP | 2003-113932 | 4/2003 |
| JP | 2003-531764 | 10/2003 |
| JP | 2005-076875 | 3/2005 |
| WO | WO 01/66971 A1 | 9/2001 |

OTHER PUBLICATIONS

EP Search report of Appln. No. 08722347.5 dated Aug. 2, 2012 in English.

* cited by examiner

FIG. 1A

(a) ROOFTOP (a) FIG. 2A (b) FIG. 2B

TRACK CAR DRIVE SYSTEM, AND TRACK CAR USING THE SYSTEM

TECHNICAL FIELD

The present invention relates to a track car drive system having a transmission for transmitting and outputting the rotation output of an engine, and a track car using the system.

BACKGROUND ART

Some existing diesel railcar drive systems are formed as a system for entering the output of a diesel engine to a transmission, and transmitting the output of the transmission via a drive shaft to wheels. According to such a system, every gear shift is performed via the transmission. On the other hand, a different type of drive system has been proposed, wherein all the output of the engine is entered to the generator, and the electric energy output from the generator is entered to the inverter and subjected to frequency conversion so as to electrically drive motors mounted on a bogie. Even if the engine has stopped, power obtained from a battery can drive the motors. According to this type of drive system, during deceleration regeneration, either full power or excessive power according to the drive state of the car is charged to the battery.

There has been disclosed a bridge-type transmission having two intermediate shafts, wherein a backward gear is disposed between the input shaft and the intermediate shaft (refer to patent document 1). The transmission is an active shift transmission including first and second intermediate shafts disposed between a transmission input shaft connected to the engine and a transmission output shaft, and speed change gears disposed between the intermediate shaft and the input shaft and between the intermediate shaft and the output shaft, wherein the transmission ratio is determined by the two sets of speed change gear ratios, and in addition, a differential device is connected between the intermediate shafts, an electric motor is connected to a third shaft of the differential device, and active variable speed is performed by making a motor temporarily carry the engine torque. If the speed change gear of the input shaft is released without increasing the number of engagement clutches, and the drag loss of engine at the time of regenerative braking can be prevented by detaching the engine. However, since the present active shift transmission is for automobiles, there is only one (single side) backward gear.

Further, an automatic transmission formed by inserting an electric motor between both clutch shafts of a twin clutch type automatic transmission is proposed to control the torque and rotation speed of the electric motor for smooth and efficient speed change control and to realize creep control, idle stop start control, and R→D/D←R select control (refer to patent document 2). The proposal includes automatic transmission having a fixed brake or a fixing clutch disposed on one of the intermediate shafts, but the object thereof is restricted to starting the engine.

Patent document 1: Japanese patent application laid-open publication No. 2005-76875
Patent document 2: WO01/66971

SUMMARY OF THE INVENTION

Problem to be Solved by the Invention

In track cars such as diesel railcars, the car must perform forward and backward operation in the same manner, which differs from automobiles (having first to fourth gears for forward movement and only an R gear for backward movement). In other words, there is a demand in diesel railcars that the speed change must be carried out at the same speeds in the forward and backward direction. Therefore, in a track car drive system in which the motor is used for tractive assistance, the problem to be solved in a transmission is to adopt a gear arrangement having the same number of gear shift steps and the same gear ratio for each gear shift step for forward and backward movement and to be capable of combining the same with the motor.

Means to Solve the Problem

The track car drive system according to the present invention has an engine and a transmission for transmitting and outputting a rotation output of the engine, wherein the rotation of an output shaft of the transmission is transmitted to drive wheels of the track car, characterized in that the transmission comprises a first intermediate shaft and a second intermediate shaft arranged in parallel with an input shaft, multiple sets of speed ranges disposed between and engaged with the first intermediate shaft or the second intermediate shaft and the output shaft for selectively transmitting power, and a forward range and a backward range disposed between the input shaft and the two intermediate shafts for selectively transmitting the rotation of the input shaft, wherein a number of shift gear steps obtained by the combination of the selection of the forward range or the backward range and the selection of the multiple sets of speed ranges is equal for forward movement and backward movement, the system further comprises a generator motor for outputting power from or inputting power to a battery via an inverter, and the generator motor provides rotation power to or receives rotation power from the first intermediate shaft and/or the second intermediate shaft provided to the transmission.

According to the track car drive system of the present invention, the transmission combines two intermediate shafts having different speed ranges between the output shaft, and the forward and backward ranges, the same number of speed range and gear ratios are obtained regardless of whether the railway car is moving forward or backward. Further, the assist rotation force by the generator motor can be applied to the output shaft through the transmission. Furthermore, since the present drive system comprises a generator motor capable of generating power by receiving a portion of or all the output of the transmission, the present drive system constitutes a hybrid drive system in which the power from the engine and the motor output from the generator motor can be selectively transmitted to the drive wheels of the railway car, and the excessive power of the engine can be used for power generation and stored as electric energy, and even further, the kinetic energy can be recovered as regenerative energy by generating power during braking of the track car, which contributes to saving energy.

According to the present track car drive system, a differential mechanism is disposed between the generator motor and the first and second intermediate shafts, and the generator motor is connected to a differential output shaft of the differential mechanism. The assist rotation force by the generator motor can be applied to the output shaft via the first intermediate shaft or the second intermediate shaft, and when a speed difference is generated between the first intermediate shaft and the second intermediate shaft, the difference can be absorbed via the differential mechanism.

According to the present track car drive system, the differential mechanism has a connect gear train composed of a plurality of gears arranged in line between at least the first or the second intermediate shaft, and further has a fixing clutch for constraining the rotation of the gears of the connect gear train. By providing a fixing clutch for constraining the rotation of the gear of the connect gear train arranged in line to the differential mechanism, the rotation of one of the intermediate shafts connected without intervening the differential mechanism is stopped, so that when performing motor start by starting the car by operating the generator motor as motor, or when generating power by operating the generator motor as generator, the control can be facilitated and the power generation efficiency can be increased.

According to the present track car drive system, the generator motor is attached to a car body of the track car as a separate component from the transmission, a connection shaft of the differential mechanism to the generator motor is taken out to an exterior of the transmission, and a flexible joint is used to connect the connection shaft and the generator motor. The equipment used in the track car drive system must be subjected to maintenance periodically as a part of the maintenance and inspection operation. The generator motor is a relatively completed equipment and includes very few parts that are subjected to abrasion by sliding movement. In comparison, the transmission is an equipment including engagement of gear wheels and sliding contact of clutches, so the maintenance cycle for replacing components subjected to abrasion or for removing particles generated by the abrasion is short. If the generator motor is formed as a separate component from the transmission and attached to the car body, the timings at which the generator motor and the transmission must be removed from the car body differ due to the difference in maintenance cycles. In order to cope with this situation, the generator motor and the transmission are connected via a flexible joint such as a universal joint. By adopting such joint structure, the transmission and the generator motor can be disposed as separate components and the generator motor can be disposed on the rear side of the transmission, so that the removal and reattachment of the generator motor and the transmission with respect to the car body or the separation and reconnection thereof can be facilitated and performed efficiently.

According to the above-mentioned track car drive system adopted in a hybrid drive system, when the engine is not used as traction of the car, such as when the car stops or is coasting, all the speed ranges are released and the fixing clutch is engaged, either one of the forward range or the backward range disposed on the intermediate shaft not having the connect gear train directly connected thereto is selectively engaged, and the output of the engine is transmitted via the differential mechanism to the generator motor for power generation. According to such arrangement, when the engine is not used as traction of the car, such as when the car stops or is coasting, the engine output is not transmitted to any of the speed ranges, but transmitted via the differential mechanism to the generator motor, and the power generator can perform power generation.

According to the above-mentioned track car drive system adopted in a hybrid drive system, when the car is running with one of the speed ranges engaged, one of the other speed ranges disposed on the intermediate shaft not having the speed range connected thereto is engaged, and the differential mechanism transmits the rotation difference between the first intermediate shaft and the second intermediate shaft to the generator motor for power generation. According to this arrangement, even when the drive force of the engine is used as traction force of the car via any of the speed ranges, by engaging one of the other speed ranges disposed on the other intermediate shaft, the differential mechanism can transmit the rotation difference of the first intermediate shaft and the second intermediate shaft to the generator motor and the generator motor can perform power generation.

According to the above-mentioned track car drive system adopted in a hybrid drive system, when the car is running with one of the speed ranges disposed on the intermediate shaft not having the connect gear train directly connected thereto engaged, all the speed ranges disposed on the intermediate shaft to which the connect gear train is directly connected are released, the fixing clutch is engaged, and the differential mechanism transmits a difference of rotation between the first intermediate shaft and the second intermediate shaft to the generator motor for power generation. According to this arrangement, the rotation force taken in from the output shaft by the inertia of the track car can rotate one of the intermediate shafts via the engaged speed range, and the rotation difference with the other intermediate shaft having its rotation stopped by the engagement of the fixing clutch is transmitted to the generator motor, so that a regenerative braking can be performed in which the braking of the car is performed by regenerating the kinetic energy of the track car.

According to the above-mentioned track car drive system having a differential mechanism, when one of the speed ranges is engaged, one of the other speed ranges disposed on the intermediate shaft not connected to said speed range is engaged, and the differential mechanism transmits the power generated by the generator motor to the first intermediate shaft and the second intermediate shaft for running the car. According to this arrangement, the power generated by the generator motor is transmitted to the output shaft via the speed range engaged to each intermediate shaft, so as to start the car via the generator motor. The differential mechanism can absorb the difference in the number of rotations of the speed ranges of the two intermediate shafts. In this case, the speed range being engaged depends on the number of rotations of the motor and the required car performance, so the first range can be selected, for example.

According to the above-mentioned track car drive system having a differential mechanism, when one of the speed ranges disposed on the intermediate shaft not having the connect gear train directly connected thereto is engaged, all the speed ranges disposed on the intermediate shaft having the connect gear train directly connected thereto are released, the fixing clutch is engaged, and the differential mechanism transmits the power generated by the generator motor to the first and second intermediate shafts for running the car. According to this arrangement, the power generated by the generator motor can be transmitted from the differential mechanism to the output shaft via the speed range being engaged. At this time, by engaging the fixing clutch, the side of the differential mechanism having the fixing clutch is stopped from being rotated, and the output of the generator motor can be transmitted efficiently to the output shaft. In this case, the speed range being engaged depends on the number of rotations of the motor and the necessary car performance, so the second range can be selected, for example.

The present invention can provide a track car comprising the aforementioned track car drive system, for driving the drive wheel by the output of the track car drive system.

EFFECT OF THE INVENTION

The track car drive system according to the present invention having the above-mentioned arrangements exerts the following effects. The system enables the car to run solely via the generator motor used for tractive assistance, according to which the engine noise can be reduced. Since the clutch is synchronized during gear transmission and the gear transmission can be performed without torque interruption, the shock during gear transmission can be reduced compared to prior art railway motor cars, and the impact generated between cars can also be reduced, so that the ride quality of the track car is improved. Further, since there is no torque interruption, the acceleration performance is improved. Furthermore, since the drive system can be driven without a torque converter, it does not require a friction clutch, and does not cause drag of idle clutches, so that the drive efficiency is high, the fuel consumption is improved, the required amount of lubricant oil is small and heat generation is small, so that there is no need to provide a lubricant oil cooling device, according to which the initial cost can be reduced, and maintenance work can be cut down. Further, regarding transmission, since there is no need to enhance the rigidity so as to attach the generator motor, the initial cost can be cut down. Furthermore, by disposing the transmission and the generator motor as separate components, the freedom of arrangement can be improved, and weight distribution of the car can be set in a balanced manner. Furthermore, the transmission and the generator motor can be easily subjected to maintenance individually.

By adopting a generator motor, the braking energy can be regenerated as electric energy and stored in the battery for use as drive force, according to which the drive performance and the fuel consumption can be improved compared to prior art railway motor cars. Furthermore, since a generator for collecting energy and a motor for generating power can be used commonly, the initial cost of the system can be cut down.

DESCRIPTION OF REFERENCE NUMBER

1 railway car
2 roof
3 floor
4,4 bogie
5 wheel
6 reduction gear
10 driving battery
11 driving battery reactor
12 line breaker
13 fuel tank
14 engine
15 transmission (active shift transmission)
16 propeller shaft
17 inverter
18 generator motor
19 engine controller
20 transmission controller
21 control battery
22 radiator
25 flexible joint
29 output shaft (for engine)
30 input shaft (for transmission 15)
31 forward range
32 backward range
33 input gear
34 first gear
35 second gear
36 input gear
37, 38 reverse gear
39 third gear
40 fourth gear
41 first intermediate shaft
42 second intermediate shaft
43 first clutch
44 second clutch
45 output shaft (for transmission 15)
46 third clutch
47 fourth clutch
51 first speed range
52 second speed range
53 third speed range
54 fourth speed range
55 differential mechanism
57 takeoff gear
58 takeoff shaft
60 connect gear train
61 fixing clutch

BEST MODE FOR CARRYING OUT THE INVENTION

Figure 1A:
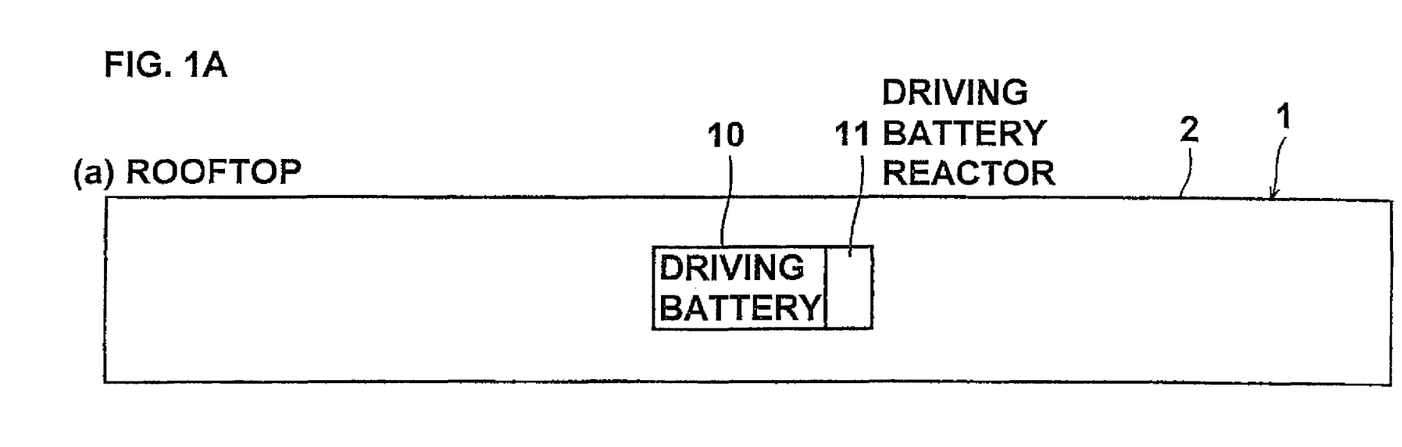
FIG. 1A A frame format illustrating one example of a track car, especially a railway car, to which the track car drive system according to the present invention is applied, showing a plan view of a roof top.
Figure 1B:
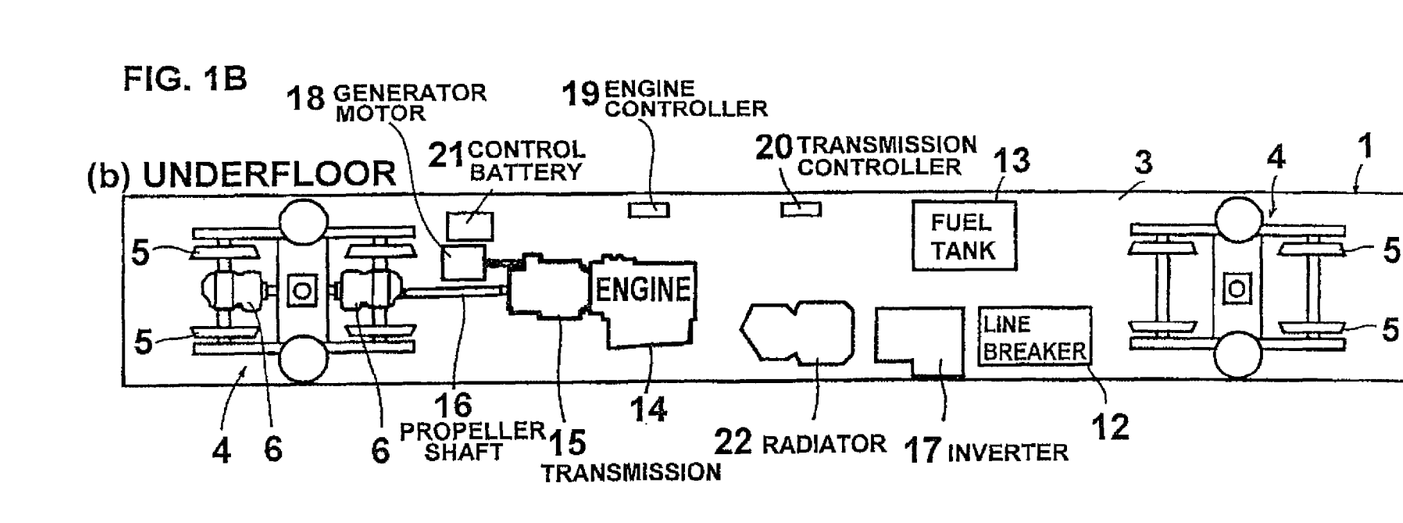
FIG. 1B A frame format illustrating one example of a track car, especially a railway car, to which the track car drive system according to the present invention is applied, showing a lower side view taken from a plane along the lower plane of the floor.

FIGS. 1A and 1B are views showing a frame format of an example of a track car, especially a railway car, to which the present track car drive system according to the present invention is applied, wherein FIG. 1A shows a plan view illustrating the roof top, and FIG. 1B shows a view taken from a plane along the lower plane of the floor and viewing the lower side therefrom. As shown in FIG. 1A, on the top of a roof 2 of a railway car 1 are disposed a driving battery 10 and a driving battery reactor 11.

As shown in FIG. 1B, bogies 4, 4 for supporting the railway car 1 and including wheels 5 capable of running on tracks (railroads) and reduction gears 6 are arranged, and various devices listed below are disposed in a suspended manner below the floor 3 of the railway car 1. A fuel tank 13 storing fuel such as diesel oil and acting as a supply source, an engine 14 composed of an internal combustion engine such as a diesel engine driven by receiving fuel supply from the fuel tank 13, a transmission (active shift transmission) 15 disposed close to the engine 14 for receiving rotation output of the engine 14 to vary the speed of the rotation output and output the same to a propeller shaft 16, an inverter 17 to which the power from the driving battery 10 on the roof 2 is entered, and a generator motor 18 receiving supply of AC power having been subjected to frequency conversion via the inverter 17 and in some cases receiving power from the engine 14 so as to function as a power generator are supported in a suspended manner under the floor 3 of the car. As shown in FIG. 1B, a line breaker 12 for disconnecting the flow of current between the driving battery 10 and the generator motor 18 mentioned in detail later is disposed on the floor 3 of the railway car 1.

The transmission output of the transmission 15 is transmitted via a propeller shaft 16 to a reduction gear 6 disposed on one of the bogies (drive bogie) 4. Further, an engine controller 19, a transmission controller 20, a control battery 21 and a radiator 22 are supported in a suspended manner on the lower surface of the floor 3.

Figure 2A:
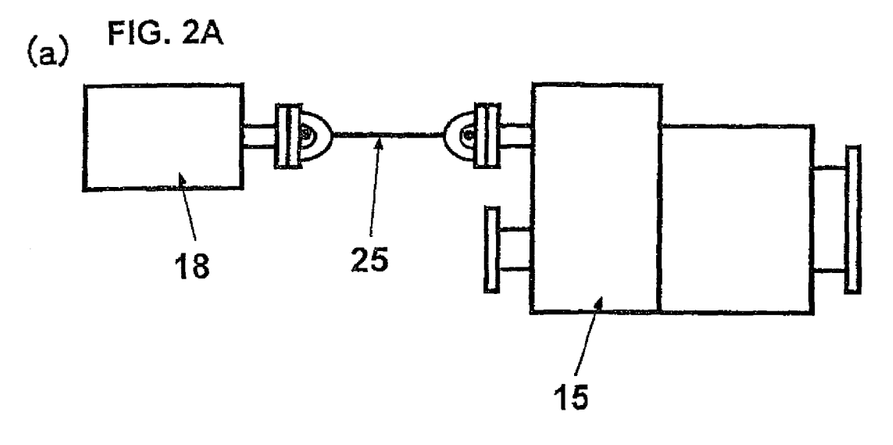
FIG. 2A An upper view showing one example of a generator motor and a transmission according to the track car drive system illustrated in FIG. 1, and a connecting structure for connecting the same.
Figure 2B:
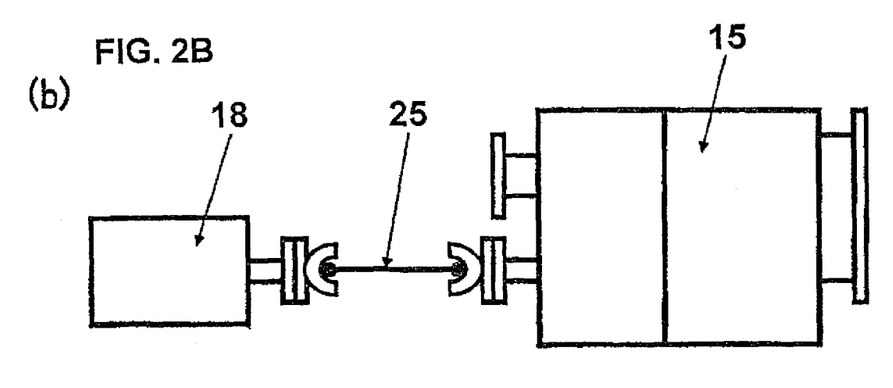
FIG. 2B A side view showing one example of the generator motor and the transmission according to the track car drive system illustrated in FIG. 1, and a connecting structure for connecting the same.

FIGS. 2A and 2B are an upper view (FIG. 2A) and a side view (FIG. 2B) of an one example of a connection structure between the generator motor and the transmission according to the track car drive system of the track car illustrated in FIGS. 1A and 1B. The timings at which the generator motor 18 and the transmission 15 are detached from the car body are varied according to the difference in the maintenance cycles of the generator motor 18 and the transmission 15, and therefore, the connection shaft (described later) between the generator motor 18 and the transmission 15 are connected via a flexible joint 25. Since a flexible joint 25 is used to connect the two components, when only one of the generator motor 18 or the transmission 15 is removed from or reassembled to the car body, the shaft connecting the same is allowed to have some inclination and it is not necessary to realize a complete alignment, so the removal and reassembling operations can be performed easily and efficiently. Further, a universal joint can be used instead of the flexible joint 25.

Figure 3:
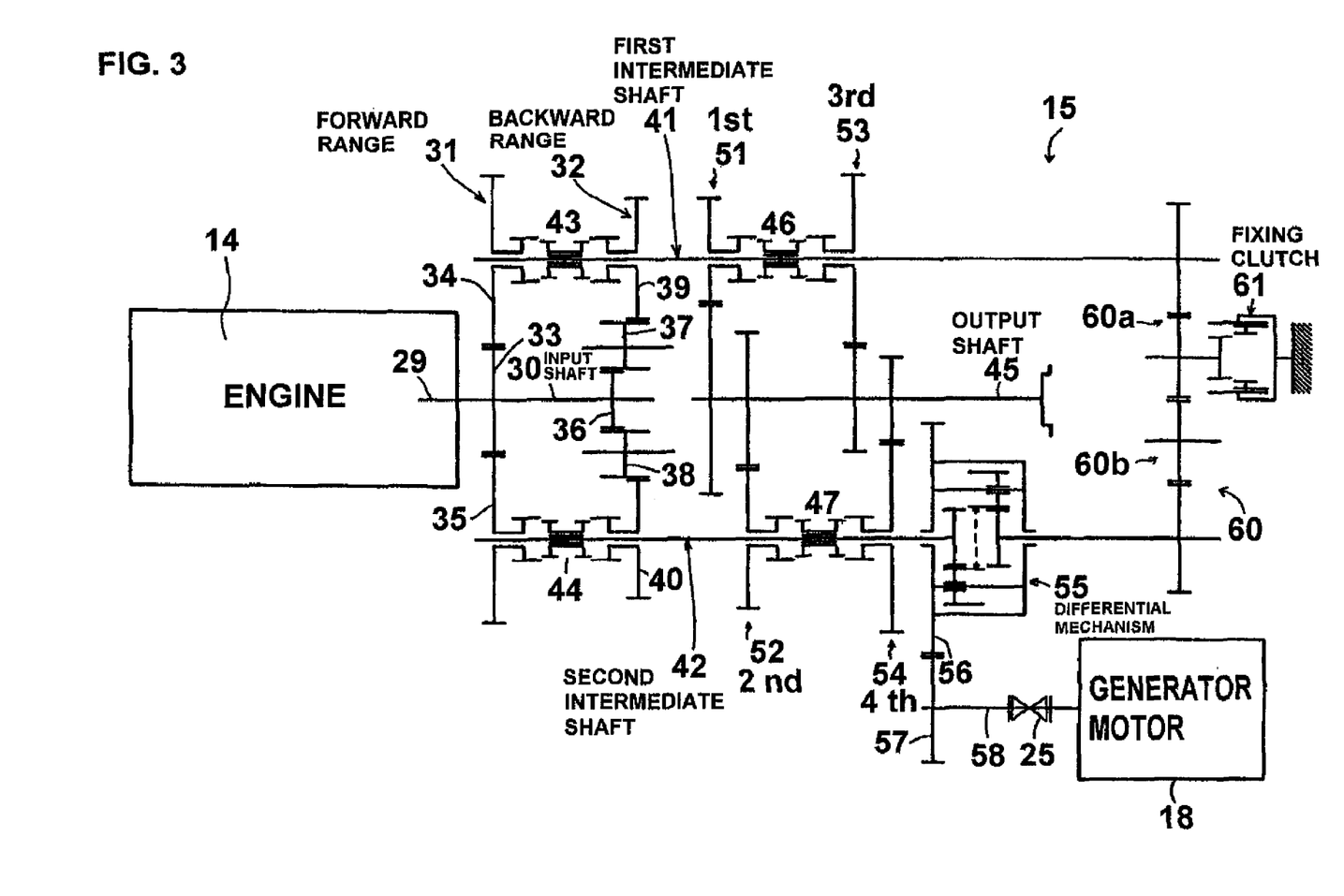
FIG. 3 A view showing in frame format the structure of the transmission according to the track car drive system illustrated in FIG. 1.

FIG. 3 is a view showing in frame format the structure of a transmission according to a track car drive system of a track car illustrated in FIGS. 1A and 1B. In the transmission 15, the output shaft 29 of the engine 14 is directly connected to the input shaft 30 of the transmission 15, and the rotation output of the engine 14 is directly entered to the transmission. A forward range 31 and a backward range 32 are arranged in parallel to the input shaft 30, and in the state where the input shaft 30 is driven to rotate, both ranges 31 and 32 are constantly driven. The forward range 31 comprises an input gear 33 connected to the input shaft 30, and a first gear 34 and a second gear 35 engaged with the input gear 33. The backward range 32 comprises an input gear 36 connected to the input shaft 30, reverse gears 37 and 38 having the same specifications and engaged with the input gear 36, and a third gear 39 and a fourth gear 40 engaged with the reverse gears 37 and 38.

A first intermediate shaft 41 and a second intermediate shaft 42 are arranged in parallel with the input shaft 30. The first gear 34 and the third gear 39 are fit in a relatively rotatable manner to the first intermediate shaft 41, and the second gear 35 and the fourth gear 40 are fit in a relatively rotatable manner to the second intermediate shaft 42. A first clutch 43 and a second clutch 44 are disposed in a selectably shiftable manner on the first intermediate shaft 41 and the second intermediate shaft 42 between the forward range 31 and the backward range 32. Therefore, a forward rotation or a backward rotation is provided to the first intermediate shaft 41 from a gear (34 or 39) engaged with the first clutch 43 by the selective shift of the first clutch 43, and a forward rotation or a backward rotation is provided to the second intermediate shaft 42 from a gear (35 or 40) engaged with the second clutch 44 by the selective shift of the second clutch 44.

An output shaft 45 is arranged in parallel with the first intermediate shaft 41 and the second intermediate shaft 42. A first speed range 51 and a third speed range 53 are arranged between the first intermediate shaft 41 and the output shaft 45, and a second speed range 52 and a fourth speed range 54 are arranged between the second intermediate shaft 42 and the output shaft 45. Different gear diameters (number of teeth) are determined for the respective speed ranges 51 through 54, so as to generate a rotation output to the output shaft 45 via a predetermined transmission ratio. Further, in the respective speed ranges 51 through 54, the gears arranged on the intermediate shafts 41 and 42 can be relatively rotated with respect to the intermediate shafts 41 and 42, but the gears arranged on the output shaft 45 are fixed to the output shaft 45.

A selectably shiftable third clutch 46 is arranged on the first intermediate shaft 41 between the first speed range 51 and the third speed range 53. Further, a selectably shiftable fourth clutch 47 is arranged on the second intermediate shaft 42 between the second speed range 52 and the fourth speed range 54.

According to the above-described arrangement of the speed ranges, in the state where the first clutch 43 is shifted toward the forward range 31, when the third clutch 46 is shifted toward the first speed range 51, the rotation of the input shaft 30 is output via the first intermediate shaft 41 and the first speed range 51 to the output shaft 45 in a first range, and when the third clutch 46 is shifted toward the third speed range 53, the rotation of the input shaft 30 is output via the first intermediate shaft 41 and the third speed range 53 to the output shaft 45 in a third range. At this time, the second clutch 44 is placed at a neutral position. Further, in the state where the second clutch 44 is shifted toward the forward range 31, when the fourth clutch 47 is shifted toward the second speed range 52, the rotation of the input shaft 30 is output via the second intermediate shaft 42 and the second speed range 52 to the output shaft 45 in a second range, and when the fourth clutch 47 is shifted toward the fourth speed range 54, the rotation of the input shaft 30 is output via the second intermediate shaft 42 and the fourth speed range 54 to the output shaft 45 in a fourth range. At this time, the first clutch 43 is placed at a neutral position.

The first clutch 43, the second clutch 44, the third clutch 46 and the fourth clutch 47 are formed as a dog clutch. By shifting the sleeves splined to the respective intermediate shafts in a direction parallel to the axis line of the intermediate shafts via a shifter, they can be engaged with dog teeth provided on the respective gears.

When the first clutch 43 or the second clutch 44 is shifted toward the backward range 32, the same range can be obtained for backward movement by the selective shifting of the third clutch 46 or the fourth clutch 47. In the case of track cars, the direction of movement can be forward or backward, but there is no limitation as in automobiles in which the rearward movement is restricted to a single gear, so there are demands for the same number of gears to be provided for forward and backward directions, and the present transmission 15 can satisfy such demand. Furthermore, when an engine brake signal is entered during running via respective speed ranges, the engine 14 can be set to idle state to activate the engine brake.

A differential mechanism 55 is disposed at the end of the second intermediate shaft 42, and the take-off shaft 58 of the take-off gear 57 engaged with the ring gear 56 of the differential mechanism 55 is connected to the generator motor 18. A connect gear train 60 and a fixing clutch 61 are arranged between the first intermediate shaft 41 and the differential mechanism 55. The connect gear train 60 comprises a connect gear train portion 60a directly connected to the first intermediate shaft 41, and a connect gear train portion 60b not directly connected to the second intermediate shaft 42 but connected indirectly thereto via the differential mechanism 55.

We will now describe the state of use of the transmission 15 in response to the operation mode of the car.

[Stopped state] When the car is at a stopped state, only the third clutch 46 is engaged with the first speed range 51, and the other clutches are released. There is no output from the generator motor 18. The engine 14 is only operated in response to the necessity of auxiliaries.

[Coasting state] When the car is at a coasting state, the first clutch 43 and the second clutch 44 are both shifted toward the forward range 31 (or when the running direction of the car is backwards, toward the backward range 32). There is no output from the generator motor 18. The engine 14 is at an idle state.

Figure 4:
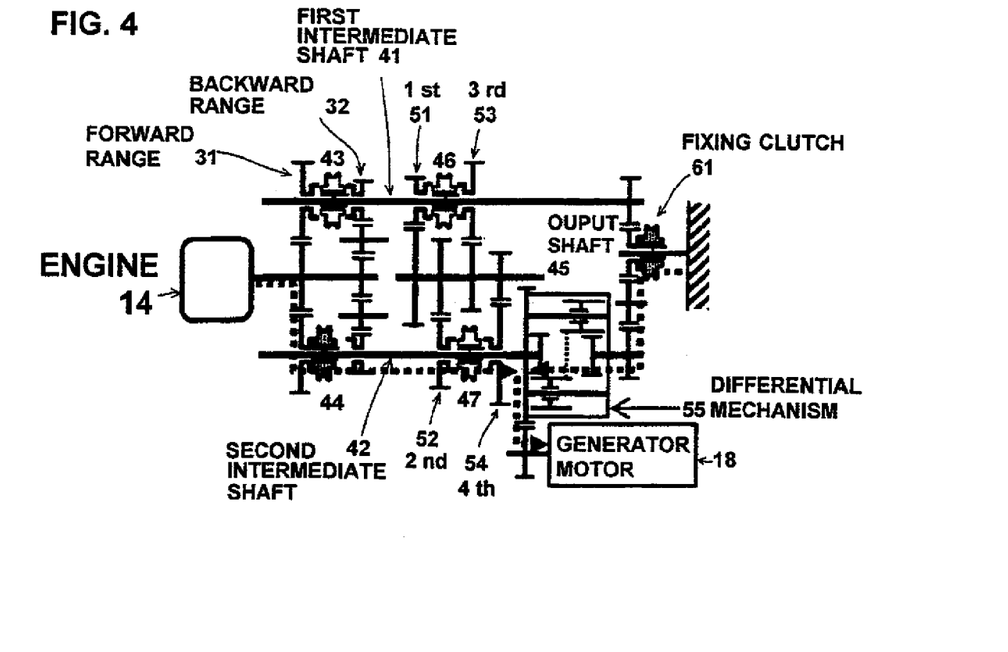
FIG. 4 An explanatory view showing a generation torque transmission path during stop and coasting according to the track car drive system of the present invention.

Power generation operation during stopped state and the power generation during battery warm-up operation and coasting will now be described with reference to FIG. 4.

[Power generation during stopped state] When power is generated while the car stops, the first clutch 43 is set to neutral position, and the second clutch 44 is shifted toward the forward (or backward) range 31 (or 32). The respective speed ranges 51 through 54 occupy neutral positions. The fixing clutch 61 is set to engaged state so as not to rotate the side of the differential mechanism 55 opposite from the second intermediate shaft (that is, the first intermediate shaft 41), and the output of the engine 14 is output via the second intermediate shaft and the take-off gear 57 and the take-off shaft 58 of the differential mechanism 55 to the generator motor 18. A similar state is realized for power generation during coasting. A similar state is also realized for warm-up operation aimed at heating batteries, such as when the temperature of the batteries 10 and 20 are below 0° C.

Figure 5:
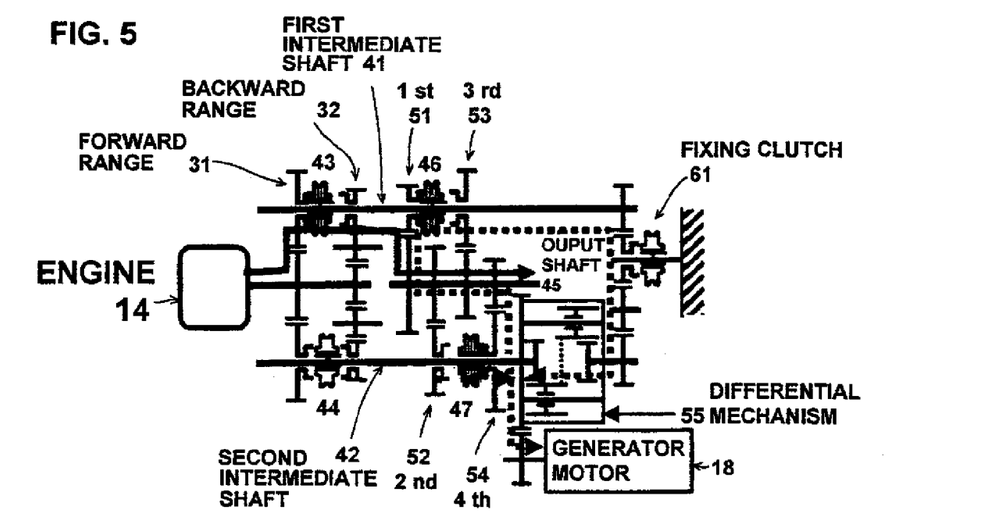
FIG. 5 An explanatory view showing a generation torque transmission path during power running according to the track car drive system of the present invention.

Power generation operation during power running will be described with reference to FIG. 5.

[Power generation during power running] This mode is for performing power running of the car by the output of the engine 14 while performing power generation by a portion of the engine output. As for first to fourth ranges, the selective shifting and engaging of the respective speed ranges 51 through 54 are performed by the third clutch 46 or the fourth clutch 47. When the car is running via the first range or the third range, the first intermediate shaft 41 is used as the power transmission path. Since the fixing clutch 61 is released, the rotation of the first intermediate shaft 41 is transmitted via the connect gear train 60 to the differential mechanism 55. By rotating the second intermediate shaft 42 via the fourth clutch 47 shifted to either direction from the output shaft 45, a power generation torque is applied from the take-off shaft 58 to the generator motor 18 as a differential between the input from the first intermediate shaft 41 and the input from the second intermediate shaft 42 in the differential mechanism 55. When the car is running via the second range or the fourth range, the second intermediate shaft 42 is already acting as the power transmission path. The first intermediate shaft 41 is rotated via the third clutch 46 shifted to either direction from the output shaft 45, and the rotation of the first intermediate shaft 41 is entered via the connect gear train 60 having the fixing clutch released 61 to the differential mechanism 55. A power generation torque is applied from the take-off shaft 58 to the generator motor 18 as a differential between the input from the first intermediate shaft 41 and the input from the second intermediate shaft 42 in the differential mechanism 55. FIG. 5 illustrates one example of a case where the fourth range is engaged to perform power generation when the car is running via the first range.

Figure 6:
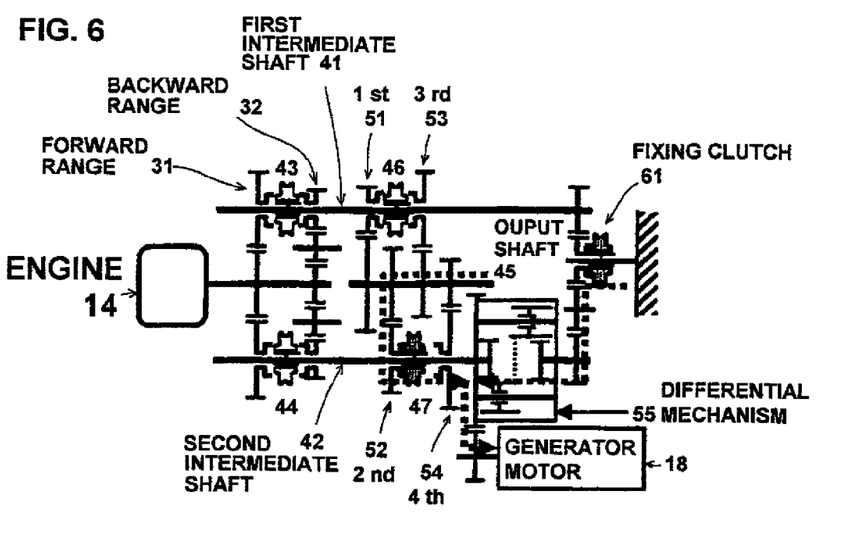
FIG. 6 An explanatory view showing a generation torque transmission path during regeneration according to the track car drive system of the present invention.

The operation during regeneration will be described with reference to FIG. 6.

[Regeneration] In regeneration operation performed while the car is running for example at the fourth range or the second range so as to increase the number of rotation of the motor, the rotation of the output shaft 45 can rotate the second intermediate shaft 42 by the shifting and engaging of the fourth clutch 47 to either direction. According to the differential mechanism 55, the first intermediate shaft 41 can be stopped by engaging the fixing clutch 61, so that a power generation torque can be applied from the take-off shaft 58 to the generator motor 18 as a differential of both inputs of the differential mechanism 55, and regeneration operation can be obtained. In order to perform regeneration by engaging the fixing clutch 61 when the car is running via the first range or the third range, at first, the third clutch 46 is set to neutral, the fourth clutch 47 is engaged to the second range or the fourth range according to car speed, and the fixing clutch 61 is engaged to perform regeneration.

Figure 7:
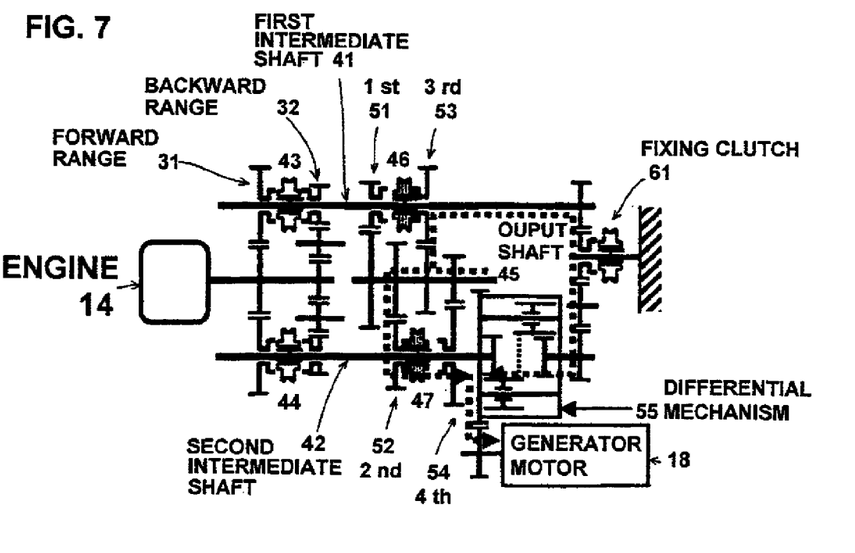
FIG. 7 An explanatory view showing the generation torque transmission path during regeneration according to the track car drive system of the present invention.

Regeneration not using the fixing clutch will be described with reference to FIG. 7, taking as an example where the car is running via the first range or the third range. Since the fixing clutch 61 is released, the first intermediate shaft 41 is rotated via the rotation of the output shaft 45 by shifting and engaging the third clutch 46 to either direction, and the second intermediate shaft 42 is rotated via the rotation of the output shaft 45 by shifting and engaging the rotation of the output shaft 45 to either direction, so that a power generation torque can be applied from the take-off shaft 58 to the generator motor 18 as a differential between both inputs of the differential mechanism 55, and regeneration operation can be obtained.

Figure 8:
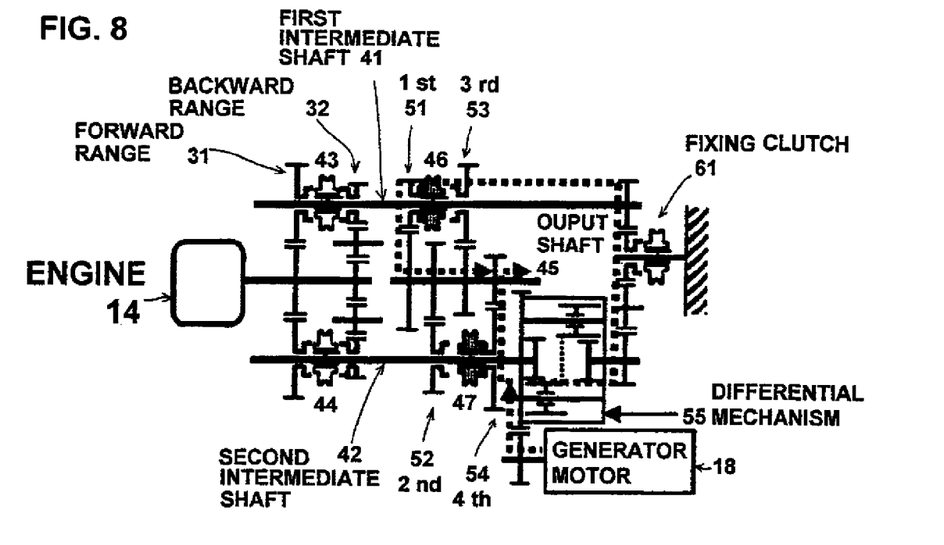
FIG. 8 An explanatory view showing the motor torque transmission path during motor start using a first range according to the track car drive system of the present invention.

Motor start operation using the first range will be described with reference to FIG. 8.

[Motor start (first range start)] When the engine 14 is at stopped state, the third clutch 46 is shifted and engaged toward the first speed range 51, and at the same time, the fourth clutch 47 is shifted and engaged toward the fourth speed range 54. The first and second clutches 43 and 44 and the fixing clutch 61 are at released state. The output of the generator motor 18 operating as motor is transmitted via the differential mechanism 55, and further on one side via the fourth speed change range 54 to the output shaft 45 and on the other side via the connect gear train 60, the first intermediate shaft 41 and the first speed range 51 to the output shaft 45. The rotational difference of the paths is absorbed by the differential mechanism 55. When the car speed is accelerated for example to 20 km/h, the engine 14 is started. After starting the engine 14, the number of rotation of the engine is controlled and the first clutch 43 is synchronized for engagement, by which the engine power is transmitted via the first intermediate shaft 41 and the first speed range 51 to the output shaft 45, where the operation mode advances to engine running mode.

Figure 9:
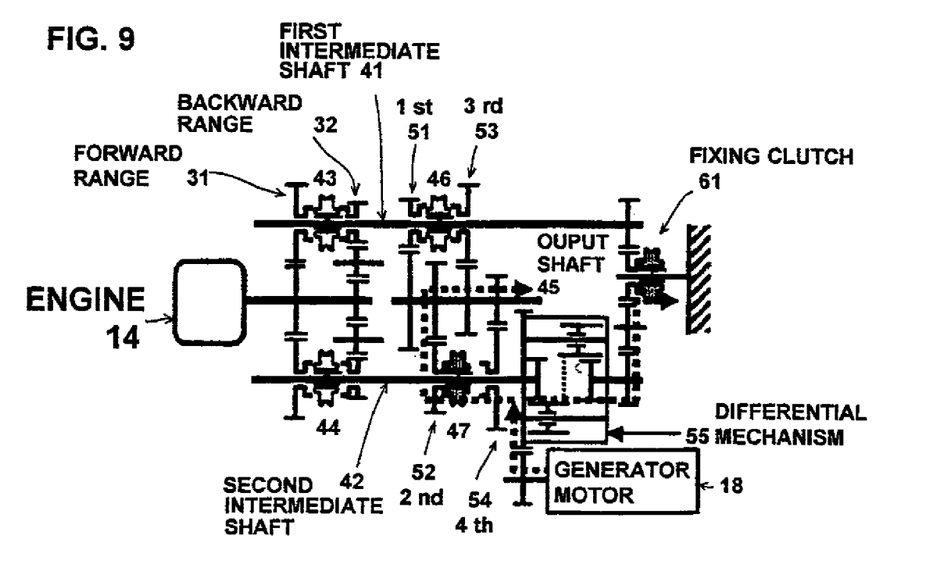
FIG. 9 An explanatory view showing the motor torque transmission path during motor start using a second range according to the track car drive system of the present invention.

Motor start operation using the second range will be described with reference to FIG. 9.

[Motor start (second range start)] When the engine 14 is stopped, the third clutch 46 is set to released state, and the fourth clutch 47 is shifted and engaged toward the second speed range 52. The first and second clutches 43 and 44 are at a released state, but the fixing clutch 61 is engaged. The output of the generator motor 18 operating as motor is transmitted in the path composed of the differential mechanism 55, the second intermediate shaft 42, the second speed range 52 and the output shaft 45. By engaging the fixing clutch 61, the differential mechanism 55 outputs the difference between the output of the generator motor 18 and the side of the fixing clutch 61 to the second intermediate shaft 42. In the present start mode, the car is started via the second speed range 52, and when the car speed is accelerated for example to 45 km/h, the engine 14 is started. After starting the engine 14, the number of rotation of the engine is controlled and the second clutch 44 is synchronized for engagement, and the engine power is transmitted via the second intermediate shaft 42 and the second speed range 52 to the output shaft 45, where the operation mode advances to engine running mode. This start mode is preferably applied to starting the car in a large station such as a busy terminal station, since the car starts and runs via motor within the station building until the car is accelerated to 45 km/h, by which the noise is effectively reduced.

Figure 10:
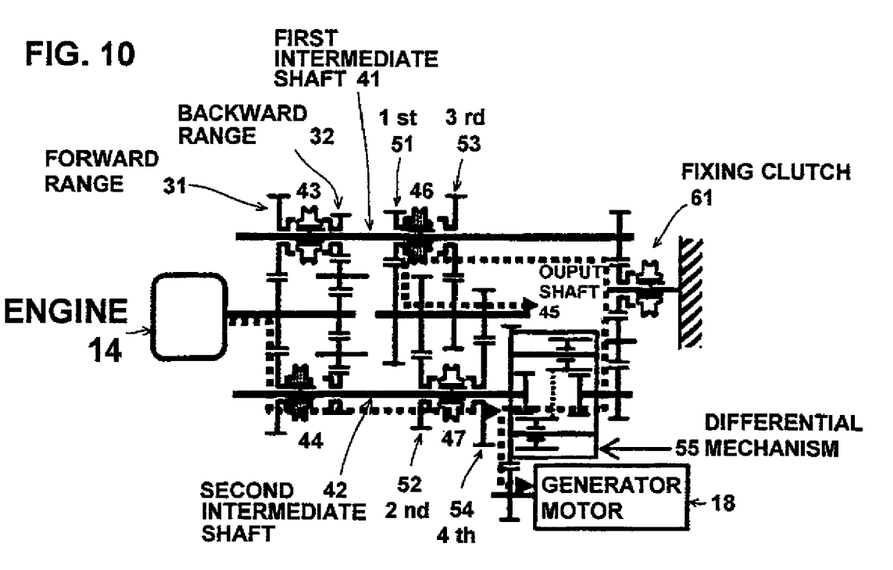
FIG. 10 An explanatory view showing the engine output torque transmission path during engine start according to the track car drive system of the present invention.

Engine start operation will be described with reference to FIG. 10.

[Engine Start]

When the charging rate of a driving battery 10 has dropped, for example, after starting the engine 14, the number of rotation of the generator motor 18 is controlled and the second clutch 44 is synchronized therewith for engagement, by which a torque is applied on the generator motor 18. When the car stops, the third clutch 46 is engaged to the first speed range 51, so the output of the engine 14 is transmitted via the second intermediate shaft 42, the differential mechanism 55, the side having the connect gear train 60, the first intermediate shaft 41 and the first speed range 51 to the output shaft 45. At this time, the difference in the number of rotation of the second intermediate shaft 42 and the number of rotation of the shaft connected to the side having the connect gear train 60 of the differential mechanism 55 is absorbed by the differential mechanism 55, and by outputting the difference between both rotation shafts, the generator motor 18 generates power via the take-off gear 57 and the take-off shaft 58.

The invention claimed is:

1. A track car drive system having an engine and a transmission for changing a speed of a rotation output of the engine and outputting the same, wherein the rotation of an output shaft of the transmission is transmitted to drive wheels of the track car, characterized in that the transmission comprises a first intermediate shaft and a second intermediate shaft arranged in parallel with an input shaft, multiple sets of speed ranges disposed between and engaged with the first intermediate shaft or the second intermediate shaft and the output shaft for selectively transmitting power, and a forward range and a backward range disposed between the input shaft and the two intermediate shafts for selectively transmitting the rotation of the input shaft, wherein a number of gear shift steps obtained by the combination of the selection of the forward range or the backward range and the selection of the multiple sets of speed ranges is equal for forward movement and backward movement;

the system further comprises a generator motor for outputting power from or inputting power to a battery via an inverter; and the generator motor provides rotation power to or receives rotation power from the first intermediate shaft and/or the second intermediate shaft provided in the transmission.

2. A track car comprising the track car drive system according to claim 1, for driving the drive wheel by the output of the track car drive system.

3. The track car drive system according to claim 1, wherein a differential mechanism is disposed between the generator motor and the first and second intermediate shafts; and the generator motor is connected to a differential output shaft of the differential mechanism.

4. A track car comprising the track car drive system according to claim 3, for driving the drive wheel by the output of the track car drive system.

5. The track car drive system according to claim 3, wherein when the car is running with one of the speed ranges engaged;

one of the other speed ranges disposed on the intermediate shaft not having the speed range connected thereto is engaged; and the differential mechanism transmits the rotation difference between the first intermediate shaft and the second intermediate shaft to the generator motor for power generation.

6. The track car drive system according to claim 3, wherein when one of the speed ranges is engaged;

one of the other speed ranges disposed on the intermediate shaft not having said speed range connected thereto is engaged; and the differential mechanism transmits the power generated by the generator motor to the first intermediate shaft and the second intermediate shaft for running the car.

7. The track car drive system according to claim 3, wherein the generator motor is attached to a car body of the track car as a separate component from the transmission;

a connection shaft of the differential mechanism to the generator motor is taken out to an exterior of the transmission; and a flexible joint is used to connect the connection shaft and the generator motor.

8. A track car comprising the track car drive system according to claim 7, for driving the drive wheel by the output of the track car drive system.

9. The track car drive system according to claim 3, wherein the differential mechanism has a connect gear train composed of a plurality of gears arranged in line between at least the first or the second intermediate shaft, and further has a fixing clutch for constraining the rotation of the gears of the connect gear train.

10. The track car drive system according to claim 9, wherein when the output of the engine is not used as traction of the car, such as when the car stops or is coasting;

all the speed ranges are released and the fixing clutch is engaged;

either one of the forward range or the backward range disposed on the intermediate shaft not having the connect gear train directly connected thereto is selectively engaged; and the output of the engine is transmitted via the differential mechanism to the generator motor for power generation.

11. The track car drive system according to claim 9, wherein
when the car is running with one of the speed ranges engaged;
one of the other speed ranges disposed on the intermediate shaft not having the speed range connected thereto is engaged; and
the differential mechanism transmits the rotation difference between the first intermediate shaft and the second intermediate shaft to the generator motor for power generation.

12. The track car drive system according to claim 9, wherein
when the car is running with one of the speed ranges disposed on the intermediate shaft not having the connect gear train directly connected thereto engaged;
all the speed ranges disposed on the intermediate shaft to which the connect gear train is directly connected are released;
the fixing clutch is engaged; and
the differential mechanism transmits a difference of rotation between the first intermediate shaft and the second intermediate shaft to the generator motor for power generation.

13. The track car drive system according to claim 9, wherein
when one of the speed ranges is engaged;
one of the other speed ranges disposed on the intermediate shaft not having said speed range connected thereto is engaged; and
the differential mechanism transmits the power generated by the generator motor to the first intermediate shaft and the second intermediate shaft for running the car.

14. The track car drive system according to claim 9, wherein
when one of the speed ranges disposed on the intermediate shaft not having the connect gear train directly connected thereto is engaged;
all the speed ranges disposed on the intermediate shaft having the connect gear train directly connected thereto are released;
the fixing clutch is engaged; and
the differential mechanism transmits the power generated by the generator motor to the intermediate shaft not having the connect gear train directly connected thereto for running the car.

15. A track car comprising the track car drive system according to claim 9, for driving the drive wheel by the output of the track car drive system.

* * * * *